United States Patent
Shivrayan et al.

(10) Patent No.: US 11,894,985 B1
(45) Date of Patent: Feb. 6, 2024

(54) OPTIMIZING LOCATIONS OF PHYSICAL OBJECTS IN A NETWORK

(71) Applicant: STARBUCKS CORPORATION, Seattle, WA (US)

(72) Inventors: Nitish Shivrayan, Saint Paul, MN (US); Brendan D. O'Shaughnessy, Seattle, WA (US); David A. M. West, Seattle, WA (US); Jay A. Chauhan, Seattle, WA (US); Fu Ern Kwan, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/084,783

(22) Filed: Dec. 20, 2022

(51) Int. Cl.
*H04L 41/14* (2022.01)
*H04L 41/22* (2022.01)
*H04L 41/147* (2022.01)

(52) U.S. Cl.
CPC .......... *H04L 41/145* (2013.01); *H04L 41/147* (2013.01); *H04L 41/22* (2013.01)

(58) Field of Classification Search
CPC ....... H04L 67/1097; H04L 67/52; H04L 9/50; H04L 65/403; H04L 67/12; H04L 9/3239; H04L 67/101; H04L 67/1008; H04L 41/12; H04L 65/1069; H04L 67/14; H04L 61/4511; H04L 67/1001; H04L 9/40; H04L 2209/56; H04L 65/1101; H04L 67/10; H04L 69/329; H04L 41/0806; H04L 12/1827; H04L 67/02; H04L 63/08; H04L 67/51; H04L 41/40; H04L 67/1021; H04L 12/1813; H04L 12/1818; H04L 61/45; H04L 67/54; H04L 67/568; H04L 41/22; H04L 65/80; H04L 67/147; H04L 67/1029; H04L 12/66; H04L 65/612; H04L 67/01; H04L 63/0272; H04L 63/083; H04L 67/1038; H04L 67/34; H04L 12/1886; H04L 41/046; H04L 41/0895;

(Continued)

(56) References Cited

U.S. PATENT DOCUMENTS

| | | | |
|---|---|---|---|
| 9,760,840 B1 * | 9/2017 | Tyagi | G06Q 10/06313 |
| 11,405,329 B1 * | 8/2022 | Cuthbert | G06N 20/00 |

(Continued)

*Primary Examiner* — Djenane M Bayard
(74) *Attorney, Agent, or Firm* — Kilpatrick Townsend & Stockton LLP

(57) ABSTRACT

In some examples, a system can execute an iterative optimization routine on a set of candidate physical locations for an object. Each iteration can involve a series of operations. The operations can include selecting one of the candidate physical locations; determining a predicted demand value for the candidate physical location based on a first traffic score and a second traffic score associated with the candidate physical location; and determining a predicted overhead value for the candidate physical location. The operations can also include determining a predicted cannibalization factor for the candidate physical location; and generating an overall score for the candidate physical location based on the predicted demand value, the plurality of predicted overhead values, and the predicted cannibalization factor. The system may then identify one or more of the candidate physical locations as optimal locations based on their overall scores and display the optimal locations on a geographical map.

20 Claims, 5 Drawing Sheets

(58) Field of Classification Search
CPC . H04L 45/24; H04L 65/4046; H04L 12/4633; H04L 41/0893; H04L 41/122; H04L 12/4641; H04L 5/0037; H04L 41/0896; H04L 45/54; H04L 45/66; H04L 49/00; H04L 49/15; H04L 49/25; H04L 49/70; H04L 61/256; H04L 41/0897; H04L 1/0025; H04L 1/0038; H04L 1/0041; H04L 1/0045; H04L 1/06; H04L 27/34; H04L 27/362; H04L 5/14; H04L 5/0053; H04L 47/70; H04L 12/28; H04L 2101/69; H04L 9/3263; H04L 12/1881; H04L 43/04; H04L 47/15; H04L 47/2475; H04L 65/611; H04L 67/535; H04L 12/189; H04L 25/0204; H04L 41/0886; H04L 45/245; H04L 47/41; H04L 47/724; H04L 5/0032

See application file for complete search history.

(56) References Cited

U.S. PATENT DOCUMENTS

| | | | |
|---|---|---|---|
| 2003/0033195 A1* | 2/2003 | Bruce | G06Q 30/0205 705/7.34 |
| 2017/0078183 A1* | 3/2017 | Civanlar | H04L 45/64 |
| 2018/0349925 A1* | 12/2018 | Moustafa | G06Q 10/04 |
| 2019/0089107 A1* | 3/2019 | Funke | H01R 12/721 |
| 2021/0158245 A1* | 5/2021 | Ames, II | G06Q 10/06315 |
| 2022/0374784 A1* | 11/2022 | Sharma | G06F 18/217 |

\* cited by examiner

OPTIMIZING LOCATIONS OF PHYSICAL OBJECTS IN A NETWORK

TECHNICAL FIELD

The present disclosure relates generally to computerized techniques for optimizing locations of physical objects. More specifically, but not by way of limitation, this disclosure relates to computerized techniques for optimizing locations of physical objects in a network, for example to increase traffic flow to the network.

BACKGROUND

Entities such as companies may deploy objects at physical locations around the world. For example, a network operator may deploy a group of physical servers at various locations around the world. Each entity may have its own network of objects that are deployed in disparate physical locations. For example, a first entity may operate a first network of physical servers that are deployed at a first set of physical locations, and a second entity may operate a second network of physical servers that are deployed at a second set of physical locations. One entity's network may compete with another entity's network for users. For example, the first network may have a first server in a geographical region, and the second network may have a second server in the geographical region. The first server may compete against the second server for user traffic associated with that geographical region.

SUMMARY

One example of the present disclosure includes a non-transitory computer-readable medium comprising program code that is executable by one or more processors for causing the one or more processors to perform operations. The operations can include executing an iterative optimization routine configured to evaluate a group of candidate physical locations to determine one or more optimal locations at which to deploy one or more objects in a target geographical region. Each iteration in the iterative optimization routine can involve: selecting a candidate physical location from the group of candidate physical locations; executing a trained demand model configured to output a predicted demand value for the candidate physical location based on a first traffic score and a second traffic score associated with the candidate physical location; executing one or more trained overhead models configured to output a plurality of predicted overhead values for the candidate physical location; determining a predicted cannibalization factor for the candidate physical location; and generating an overall score for the candidate physical location based on the predicted demand value, the plurality of predicted overhead values, and the predicted cannibalization factor. The operations can also include determining the one or more optimal locations based on the overall score associated with each candidate physical location, and generating a graphical user interface that includes a visual map having graphical elements identifying the one or more optimal locations.

Another example of the present disclosure includes a method including operations. The operations can include executing an iterative optimization routine configured to evaluate a group of candidate physical locations to determine one or more optimal locations at which to deploy one or more objects in a target geographical region. Each iteration in the iterative optimization routine can involve: selecting a candidate physical location from the group of candidate physical locations; executing a trained demand model configured to output a predicted demand value for the candidate physical location based on a first traffic score and a second traffic score associated with the candidate physical location; executing one or more trained overhead models configured to output a plurality of predicted overhead values for the candidate physical location; determining a predicted cannibalization factor for the candidate physical location; and generating an overall score for the candidate physical location based on the predicted demand value, the plurality of predicted overhead values, and the predicted cannibalization factor. The operations can also include determining the one or more optimal locations based on the overall score associated with each candidate physical location, and generating a graphical user interface that includes a visual map having graphical elements identifying the one or more optimal locations.

Yet another example of the present disclosure includes a system comprising one or more processors and one or more memories. The one or more memories can include instructions that are executable by the one or more processors for causing the one or more processors to perform operations. The operations can include executing an iterative optimization routine configured to evaluate a group of candidate physical locations to determine one or more optimal locations at which to deploy one or more objects in a target geographical region. Each iteration in the iterative optimization routine can involve: selecting a candidate physical location from the group of candidate physical locations; executing a trained demand model configured to output a predicted demand value for the candidate physical location based on a first traffic score and a second traffic score associated with the candidate physical location; executing one or more trained overhead models configured to output a plurality of predicted overhead values for the candidate physical location; determining a predicted cannibalization factor for the candidate physical location; and generating an overall score for the candidate physical location based on the predicted demand value, the plurality of predicted overhead values, and the predicted cannibalization factor. The operations can also include determining the one or more optimal locations based on the overall score associated with each candidate physical location, and generating a graphical user interface that includes a visual map having graphical elements identifying the one or more optimal locations.

DETAILED DESCRIPTION

Figure 1:
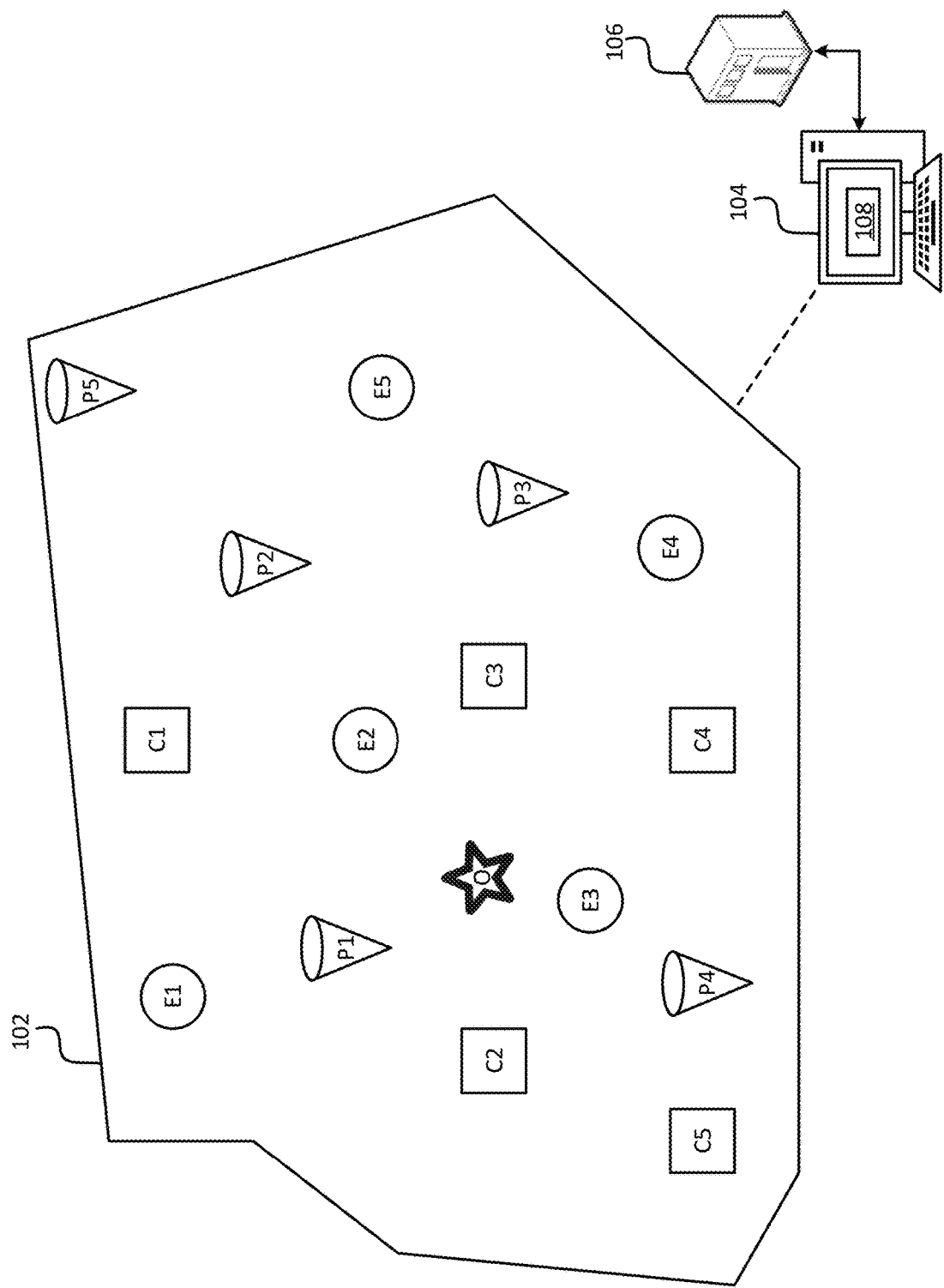
FIG. 1 shows a block diagram of an example of a system that includes an optimization engine for determining an optimal location for a new object according to some aspects of the present disclosure.

Network operators may wish to add new objects to a network for a variety of reasons, such as to increase traffic flow to the network. But it can be challenging to determine where to physically deploy those new objects for maximum impact. Network operators may spend significant amounts of time and resources determining where to deploy objects to achieve a desired result. For example, a network administrator may spend a significant amount of energy manually analyzing large amounts of data, based on their experience, to try to determine where to deploy a new physical server to increase traffic to a particular subpart of the network. Since this approach is almost entirely dependent on the experience of the network administrator and the objective, there may be varying degrees of success.

Some examples of the present disclosure can overcome one or more of the abovementioned problems by optimizing locations of objects in a network, for example to improve traffic flow through the network. More specifically, a computer system can receive user input indicating a target geographical region in which one or more new objects are to be deployed in the network. The computer system can then determine a group of candidate physical locations for the new object in the target geographical region and execute an iterative optimization routine on the group of candidate physical locations. In each iteration of the iterative optimization routine, the computer system can select a candidate physical location from the group for evaluation. The computer system can then determine a first traffic score and a second traffic score associated with the candidate physical location. Next, the computer system can execute a trained demand model to determine a predicted demand value associated with the candidate physical location based on the first and second traffic scores. The computer system can also execute one or more trained overhead models configured to determine a set of predicted overhead values associated with the candidate physical location. The computer system can further determine a predicted cannibalization factor associated with the candidate physical location. The cannibalization factor can indicate how traffic flow to existing objects in the network would be impacted by the new object at the candidate physical location. Based on some or all of these predicted values, the computer system can then generate an overall score for the candidate physical location. The computer system can iterate the above process to evaluate multiple candidate locations and combinations of candidate locations. Based on the overall score for each candidate physical location, the computer system can identify an optimal set of candidate locations from the group. The optimal set of candidate locations can include a single candidate location or a combination of multiple candidate locations. The computer system can then generate a graphical user interface that indicates the optimal set of candidate locations, for example by highlighting them on a geographical map. New objects can then be deployed at the optimal set of candidate locations to increase traffic to the network.

One specific example may involve optimizing the physical locations of network devices (e.g., physical servers, routers, or hubs) in a computer network. In this example, the objects can be the network devices. As data packets flow through the Internet from a source device to a destination device, they may be routed through the network devices of various computer networks. Each computer network can have its own physical infrastructure that includes a geographically dispersed set of network devices. The computer networks through which a data packet is routed may be selected based on the locations of the network devices in the computer networks. For example, a data packet can be routed through computer networks that are selected to minimize the propagation distance between hops. Thus, these computer networks may compete with one another for traffic flow. In some cases, a network administrator may want to increase the packet traffic through their network. One reason a network administrator may want to increase the level of packet traffic through their computer network may be to avoid underusage of network devices, which can lead to failures, errors, and other problems. But it may be challenging and expensive to physically reposition the existing network devices in the computer network. Physically repositioning the existing network devices may also generate network downtime, which is undesirable. So, the network administrator can employ the techniques described herein to determine an optimal physical location for a new network device that can be added to the computer network to increase the overall packet traffic to the computer network (e.g., as a whole). In determining the optimal physical location for the new network device, the techniques described herein can account for the fact that the new network device may absorb not only some of the packet traffic of proximate competitor networks, but also some of the packet traffic of other existing network devices in the administrator's own computer network. Once the optimal location has been determined, the new network device can then be added to the computer network in the optimal location. This can boost the overall packet traffic through the computer network.

Another example can involve optimizing the physical locations of stores in a network (e.g., a network of stores, such as a retail chain) associated with an entity. In this example, the objects can be the stores. Different entities may operate different networks of stores that compete with one another. In some cases, a store operator may want to increase the traffic to their stores. But since it may be difficult to reorganize physical stores, the operator can employ the techniques described herein to determine an optimal physical location for a new store that can be added to the network to increase the overall traffic to the network. In determining the optimal physical location for the new store, the techniques described herein can account for the fact that the new store may absorb not only some of the traffic of proximate competitor stores, but also some of the traffic of other existing stores in the operator's own network. Once the optimal location has been determined, the new store can then be built in the optimal location. This can increase the overall traffic through the network.

Yet another example can involve optimizing the physical locations of autonomous vehicles (e.g., autonomous drones or cars) in a network associated with an entity. In this example, the objects can be the autonomous vehicles. Different entities may operate different networks of autonomous vehicles that compete with one another for user traffic in geographical regions. In some cases, an operator may want to increase the usage of their mobile vehicles. But the operator may not want to reroute the paths or coverage of the existing mobile vehicles for various reasons. So, the operator can employ the techniques described herein to determine an optimal physical location for a new autonomous vehicle that can be added to the network to increase the overall usage of the network. In determining the optimal physical location for the new autonomous vehicle, the techniques described herein can account for the fact that the new autonomous vehicle may absorb not only some of the users of proximate competitor vehicles, but also some of the traffic of other existing vehicles in the operator's own network. Once the optimal location has been determined, the new autonomous vehicle can then be deployed at the optimal location. This can increase the overall usage of the operator's network of autonomous vehicles.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows an example of a target geographical region 102 that includes a first set of objects E1-5 (designated by circles) that form at least part of a first network associated with a first entity 106. These objects E1-5 are already part of the first network. The target geographical region 102 also includes a second set of objects C1-5 (designated by squares) that form at least part of a second network associated with a second entity. If the second entity is a competitor of the first entity 106, the second set of objects C1-5 may compete with the first set of objects E1-E5 for traffic. So, the second set of objects C1-5 can be referred to as competitor objects.

The first entity 106 may want to expand the first network to include one or more new objects. For example, the first entity may want to add physical servers to the first network at various physical locations in the target geographical region 102 to increase traffic to the first network. But there can be hundreds or thousands of possible locations at which one or more new objects can be deployed within the target geographical region 102. Some examples of those possible location are designated as P1-5 in FIG. 1. And deploying a new object at one physical location may have a different impact on the traffic flow to the first network than deploying the new object at another physical location. For example, deploying a new object at location P1 may result in more overall traffic-flow to the first network, while deploying the same object at location P3 may result in less overall traffic-flow to the network. Similarly, deploying multiple new objects at one combination of physical locations may have a different impact on the traffic flow than a different combination of physical locations. It may be challenging for the first entity 106 to determine the best way to deploy one or more new objects within the target geographical region 102 to achieve a target objective, such as maximizing traffic flow to the first network in the target geographical region 102.

To assist in this process, in some examples the first entity 106 can execute an optimization engine 108 on a computer system 104. Examples of the computer system 104 can include a desktop computer, laptop computer, tablet, e-reader, mobile phone, or server. The computer system 104 may include one computing device or multiple computing devices, such as a cluster of nodes. The optimization engine 108 can be software that allows the user to select the target geographical region 102 via a graphical user interface. For example, the user may be able to select the target geographical region 102 from a geographical map in the graphical user interface. The optimization engine 108 can also allow the user to select a type of object that is to be deployed within target geographical region 102 via the graphical user interface. For example, the user may be able to select a particular object type from a list of object types. After receiving these user selections, the optimization engine 108 can implement an iterative optimization routine. The iterative optimization routine can be configured to select one or more optimal locations, such as location O (designated by a star in FIG. 1), at which to deploy one or more new objects within the target geographical region 102. One example of the iterative optimization routine, along with other operations that can be performed by the optimization engine 108, will now be described below with reference to FIGS. 2-4.

Figure 2:
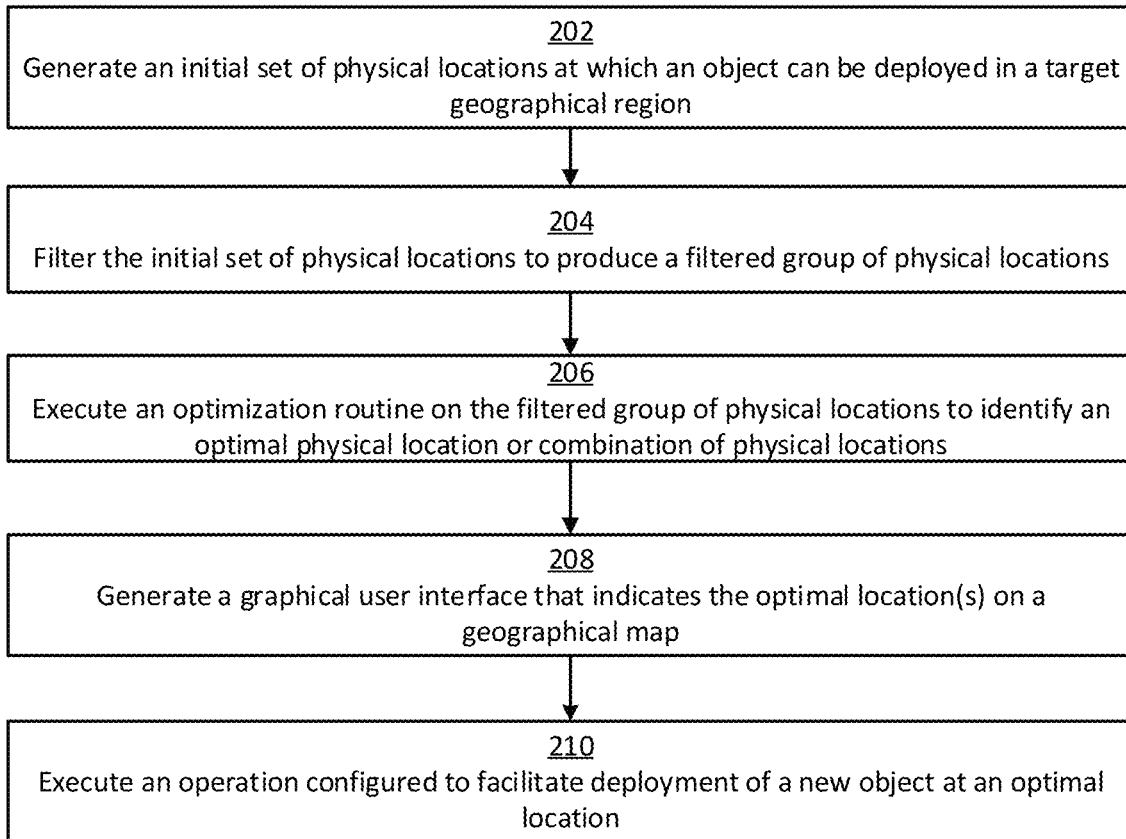
FIG. 2 shows a flow chart of an example of a process for determining an optimal location for a new object and performing corresponding operations according to some aspects of the present disclosure.

Referring now to FIG. 2, at block 202 the computer system 104 (e.g., optimization engine 108) generates an initial set of physical locations at which an object can be deployed in a target geographical region 102. As noted above, a user may have previously selected the target geographical region 102 and the type of object to deploy via a graphical user interface. The computer system 104 can then generate grid points throughout the target geographical region 102 that are spaced apart from one another by at least a predefined buffer amount, such as 500 meters (m). The predefined buffer amount may be user customizable. These grid points can serve as the initial set of physical locations. There may be hundreds of thousands of physical locations in the initial set, depending on the size of the target geographical region 102 and the predefined buffer amount.

At block 204, the computer system 104 filters the initial set of physical locations based on any number and combination of filter criteria to produced a filtered group of physical locations. For example, the computer system 104 can filter the initial set of physical locations to remove locations at which other objects are already present, since it may not be possible to deploy two objects in the same physical spot. As another example, the computer system 104 can filter out physical locations at which there are certain geographical features, such as roads, rivers, lakes, and forests, since it may not be practical to deploy an object in those locations. As still another example, the computer system 104 can also filter out physical locations that are far away from certain existing points-of-interest, since there may less traffic far away from points-of-interest. Two things are "far away from" one another if they are outside of a predefined radius of one another. To determine the points-of-interest in the target geographical region 102, the computer system 104 can access predefined point-of-interest data, such as SafeGraph® data. As yet another example, the computer system 104 can filter out physical locations that are far away from roadways, since it may be harder to access those physical locations. To determine the roadways in the target geographical region 102, the computer system 104 can access predefined roadway data, such as Tomtom® data. Some or all of these filter criteria may be user customizable. The computer system 104 can filter the initial set of physical locations based on some or all of these filter criteria, which can significantly reduce the total number of physical locations to evaluate in subsequent steps.

In block 206, the computer system 104 executes an iterative optimization routine on the filtered group of physical locations to identify an optimal physical location or combination of physical locations at which to deploy the new objects. The iterative optimization routine execute hundreds or thousands of iterations to identify the optimal physical location or combination of physical locations. These physical locations may be considered "optimal" because they yield the best results among the evaluated physical locations. An example of the iterative optimization routine is described later on with respect to FIG. 4.

Figure 3:
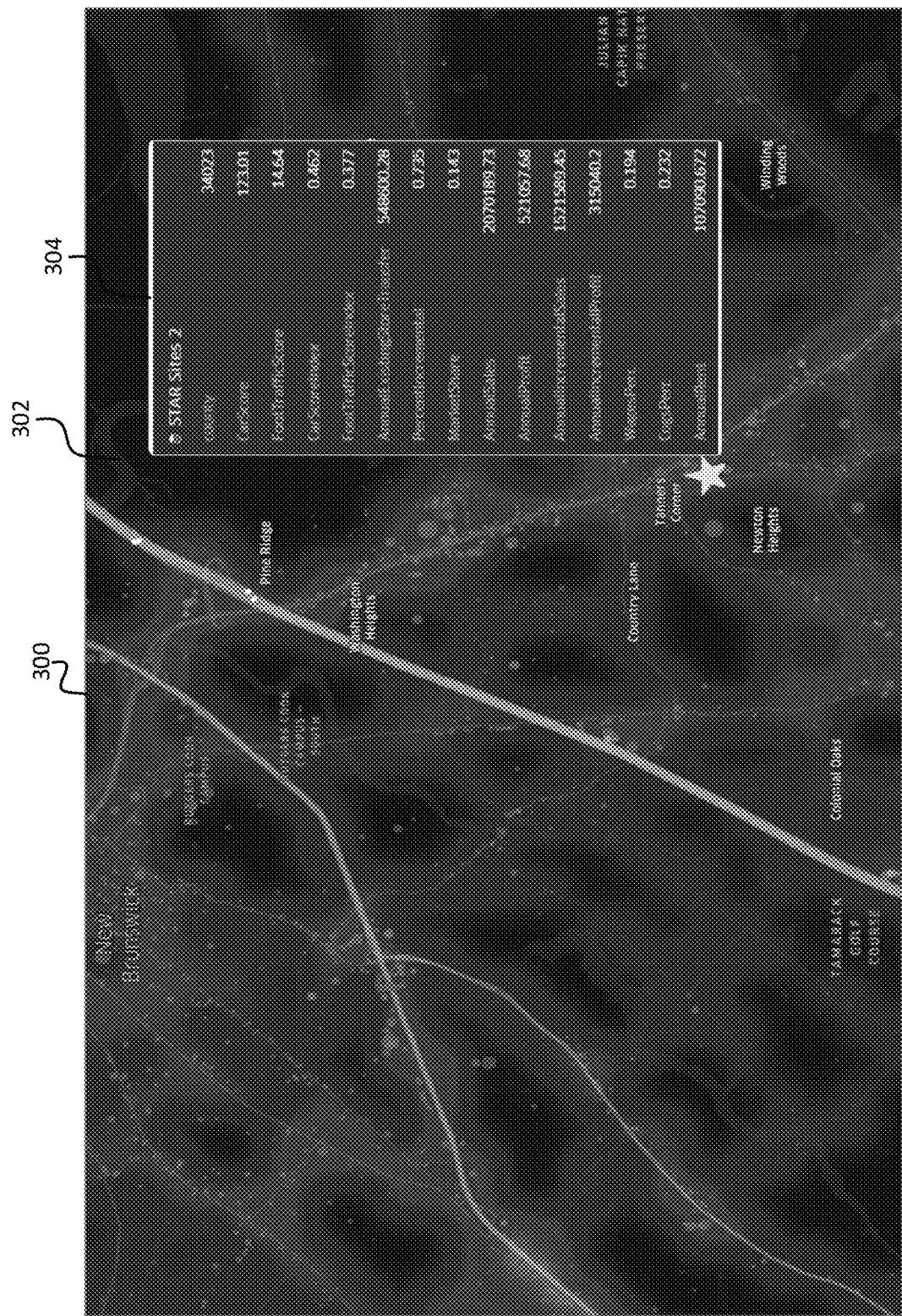
FIG. 3 shows an example of a graphical user interface according to some aspects of the present disclosure.

In block 208, the computer system 104 generates a graphical user interface that indicates the optimal physical location or optimal combination of physical locations. For example, the graphical user interface can indicate the optimal physical location or combination of physical locations on a geographical map. One example of such a graphical user interface is shown in FIG. 3. As shown, the graphical user interface 300 can include a geographical map 302 indicating the optimal location (e.g., with a star). If multiple optimal locations were identified, then some or all of those optimal locations may be highlighted (e.g., starred) on the geographical map 302. In some examples, the geographical map 302 may be a heat map that color codes locations based on their overall scores, such that locations with higher overall scores are color coded differently than locations with lower overall scores. This may help a viewer readily distinguish more-optimal regions from less-optimal regions on the geographical map 302.

In some examples, the graphical user interface 300 can be interactive such that the user can select an optimal location to receive additional information about that location. For instance, as shown in FIG. 3, the graphical user interface 300 can detect that the user selected the starred location and generate a graphical information box 304 that provides more details about that location, such as its first traffic score (e.g., foot traffic score), second traffic score (e.g., car traffic score), predicted demand value, predicted overhead value(s), predicted cannibalization factor, or any combination of these. These values may be computed during the iterative optimization routine, as described in greater detail later on.

In block 210, the computer system 104 executes an operation configured to facilitate deployment of a new object at the optimal location. For example, the graphical user interface can include a button associated with the optimal location. If the user selects the button, the computer system 104 can detect the selection and responsively transmit a signal to a client device of an operator for causing the operator to further evaluate the optimal location as a potential site for the new object. The operator can interact with the client device to, for example, accept or reject the recommended location. If the recommended location is rejected, it may be removed from the list. If it is accepted, the computer system 104 may add that location to a deployment list (e.g., a build list) for a deployment division (e.g., an installation or build division) to begin installing a new object at that location.

Figure 4:
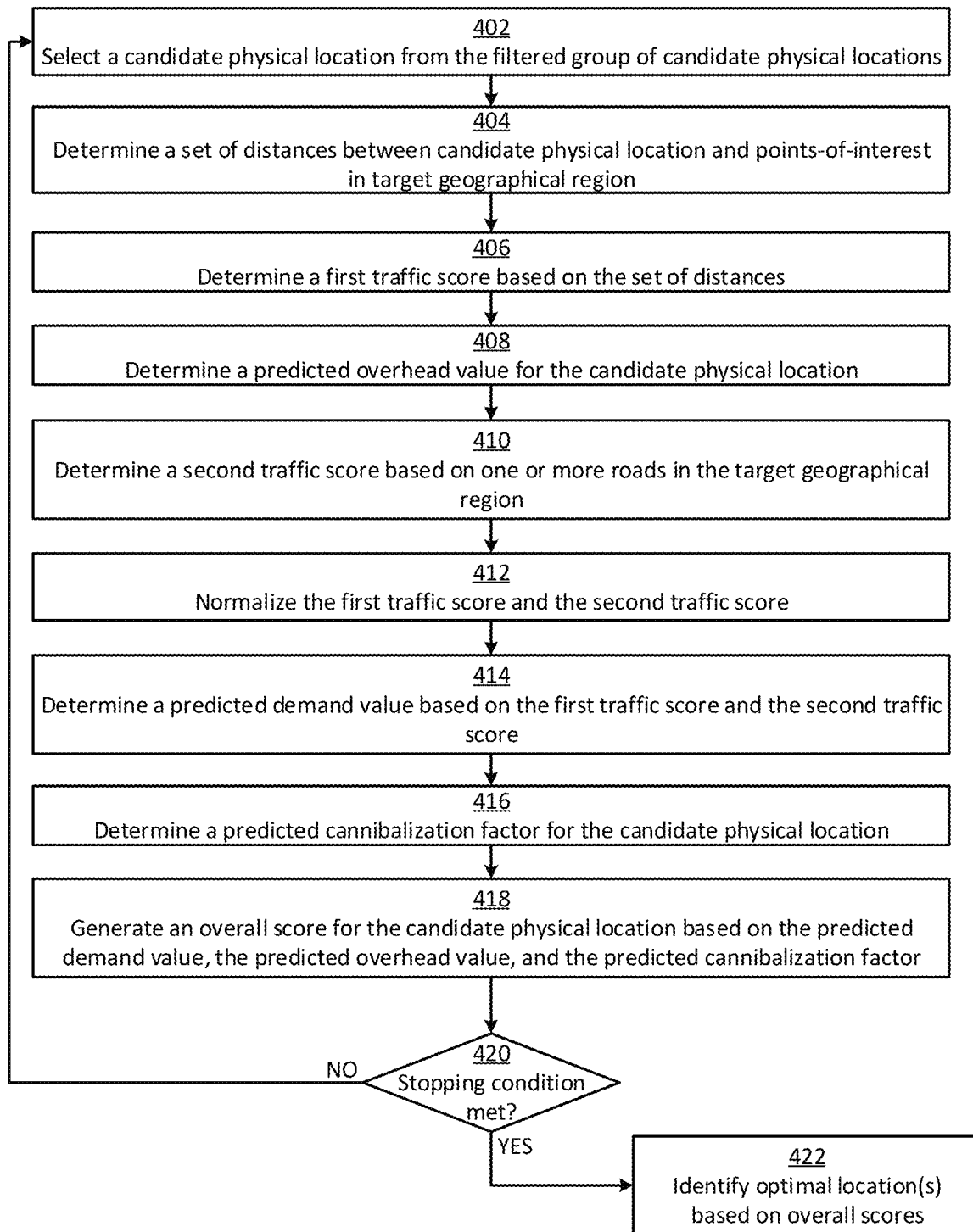
FIG. 4 shows a flow chart of an example of an iterative optimization process according to some aspects of the present disclosure.

One example of the iterative optimization routine will now be described with respect to FIG. 4. Other examples may involve more operations, fewer operations, different operations, or a different order of operations than is shown in FIG. 4.

In block 402, the computer system 104 selects a candidate physical location from the filtered group of candidate physical locations. In some examples, the computer system 104 can randomly select the candidate physical location. In other examples, the computer system can select the candidate physical location based on a predefined algorithm. Any suitable approach may be used to select the candidate physical location.

In block 404, the computer system 104 determines a set of distances between the candidate physical location and points-of-interest in the target geographical region 102. More specifically, the target geographical region 102 can include any number of points-of-interest in the target geographical region 102, which the computer system 104 can determine using predefined point-of-interest data, such as SafeGraph® data. After determining the points-of-interest, the computer system 104 can determine a respective distance between the candidate physical location and each point-of-interest. The distance can be computed using a shortest-path algorithm (e.g., Dijkstra's algorithm), a Haversine distance formula, or any other suitable approach. As one specific example, if there are 15 points-of-interest, then the computer system 104 can determine 15 corresponding distances and include them in the set of distances.

In block 406, the computer system 104 determines a first traffic score based on the set of distances. The first traffic score can indicate a probability that a first type of traffic will access the candidate physical location. In some examples, the computer system 104 can determine the first traffic score by executing a Huff Gravity Model based on a set of distances.

In general, the Huff Gravity Model is a model designed to help predict the probability of an individual (e.g., a person) in subregion i traveling to physical location j. The Huff Gravity Model can be defined as follows:

$$P_{ij} = \frac{A_j^\alpha D_{ij}^{-\beta}}{\sum_{k=1}^{n} A_j^\alpha D_{ij}^{-\beta}}$$

where $P_{ij}$ is the probability of an individual at a point-of-interest i traveling to physical location j, $A_j$ is a measure of the attractiveness of physical location j, $\alpha$ is an attractiveness parameter, $\beta$ is a distance decay parameter, D is a distance between the individual and the physical location j, and n is the total number of physical locations under investigation, including location j. The target geographical region can include any number of points-of-interest, which can be determined using the predefined point-of-interest data. The attractiveness parameter $A_j$ can take into one or more factors, such as the size of the object at location j and the distance ($\Delta$) between subregion i and physical location j. The distance ($\Delta$) can be determined from the set of distances. In some examples, the attractiveness parameter can also take into account the type of the object at location j. Different types of objects can be assigned different weights, which can be predefined prior to executing the Huff Gravity Model.

The computer system 104 can execute the Huff Gravity Model based on each distance in the set of distances to determine corresponding probabilities of individuals at the points-of-interest traveling to the candidate physical location. For example, if there are 15 points-of-interest in the target geographical region, then the computer system 104 may generate 15 corresponding probabilities. The computer system 104 can then generate the first traffic score based on the probabilities, for example by adding together the probabilities.

In block 408, the computer system 104 determines a predicted overhead value for the candidate physical location. The predicted overhead value may indicate predicted costs or other overhead (e.g., resource consumption) associated with deploying a new object deployed at the candidate physical location. The computer system 104 may execute a trained overhead model to determine the precited overhead value for the candidate physical location. Examples of the trained overhead model can include a naive model, a gradient boosting model, a neural network, or a decision tree. The computer system 104 can provide inputs to the trained overhead model to receive the predicted overhead value as output from the trained overhead model. Examples of the inputs can include attributes of the new object, such as its type, size, profile, configuration, or any combination of these.

In some examples, the computer system 104 can execute multiple trained overhead models to determine multiple overhead values associated with the candidate physical location. For example, the computer system 104 can execute a trained naïve model to determine a first set of overhead values. A "set" of overhead values can include a single overhead value or multiple overhead values. One example of the first set of overhead values can include cost-of-goods-sold, occupancy, and expense values. Additionally or alternatively, the computer system 104 can execute a trained gradient boosting model, such as Extreme Gradient Boosting (XGBoost), to determine a second set of overhead values. The second set of overhead values may correspond to different types of overhead than the first set of overhead values. One example of the second set of overhead values can include wages and benefits values. Additionally or alternatively, the computer system 104 can execute a trained neural network to determine a third set of overhead values. The third set of overhead values may correspond to different types of overhead than the first set of overhead values and the second set of overhead values. One example of the third set of overhead values can include rent and depreciation values. Any suitable number and combination of trained models can be used to determine any number and combination of overhead values.

The trained overhead model(s) can be trained using a set of training data. For example, the training data can include historical data indicating the overhead associated with multiple existing objects in the target geographical region 102 over a prior time period, such as the previous four years. In some examples, the historical data can be collected from the existing objects. For example, the computer system 104 can communicate with the existing objects via a network to obtain the historical data and aggregate it to form the training data. The computer system 104 can use the training data in a supervised or semi-supervised training process to tune the overhead models, so that they can predict an overhead value for the candidate physical location.

In some examples in which multiple overhead values are determined (e.g., using multiple models), the computer system 104 can aggregate the overhead values together into a single predicted overhead value. For example, the computer system 104 can add together all of the computed overhead values to produce a single predicted overhead value for the candidate physical location, which can serve as the predicted overhead value in subsequent operations.

In some examples, the trained overhead models may be specific to the object type (e.g., store type) selected by the user. For example, the computer system 104 can train different overhead models for different object types. Each overhead model can be trained based on a particular set of training data that corresponds to a specific object type. The computer system 104 can then select the appropriate overhead model(s) based on the object type selected by the user.

In block 410, the computer system 104 determines a second traffic score based on one or more roads in the target geographical region 102. The second traffic score can indicate a probability that a second type of traffic will access the candidate physical location. The second type of traffic can be different from the first type of traffic. For example, the first type of traffic can be TCP packet traffic transmitted through servers near the candidate physical location, and the second type of traffic can be UDP packet traffic transmitted through servers near the candidate physical location. As another example, the first type of traffic can be foot traffic and the second type of traffic can be car traffic.

More specifically, the target geographical region 102 can include one or more roads for vehicle traffic. The computer system 104 can determine the locations of the roads in any suitable manner. For example, the computer system 104 can access predefined roadway data, such as Tomtom® data, indicating the locations of roads and their traffic patterns. After determining the locations of the roads, the computer system 104 can select a road segment that is within a predefined geographical radius of the candidate physical location. The selected road segment may be the busiest road segment with the most traffic, for example after excluding freeways and other high-average-speed roads. The computer system 104 can then determine the total number of vehicles that pass along the selected road segment in a predefined time period. For example, the computer system 104 can determine that 672 cars pass along a selected road segment on average per 30 minute interval. The computer system 104 can make this determination based on the predefined roadway data, which may include this information. The computer system 104 can then determine the second traffic score based on the total number of vehicles.

In some examples, the computer system 104 determine the second traffic score based on one or more additional factors. For example, the computer system 104 can determine the second traffic score based on the total number of vehicles and a weight value. The weight value can help account for any overlap that may occur between foot traffic and car traffic. The computer system 104 can select the weight value from among a group of weight values based on the target geographical region 102. Each weight value in the group can correspond to a particular geographical region and may have been precomputed based on historical information associated with that particular geographical region.

In some examples, the computer system 104 determine the second traffic score based at least in part on one or more variable values computed using the output from the prior execution of the Huff Gravity Model in block 406. For example, the computer system 104 can determine the second traffic score based on the total number of vehicles, the weight value, and one or more variable values (e.g., a demand value) computed using the output of the Huff Gravity Model.

In block 412, the computer system 104 normalizes the first traffic score and the second traffic score. For example, if the first traffic score is 458697, the computer system 104 may apply a first translation factor to convert the first traffic score into a first normalized value that falls within a particular range, such as 1-5. The first translation factor can be determined based on the lowest traffic score and highest traffic score for the first type of traffic in the target geographical region 102. For example, the lowest traffic score can be correlated to the bottom of the range and the highest traffic score can be correlated to the top of the range. A similar process can be applied using a second translation factor to convert the second traffic score into a second normalized value that falls into the same range (e.g., 1-5). The first translation factor can be different from the second translation factor, with the goal being to normalize the first traffic score and the second traffic score to the same numerical scale.

In block 414, the computer system 104 determines a predicted demand value for the candidate physical location based on the first traffic score, the second traffic score, or both. The predicted demand value may indicate predicted usage (e.g., packet flow or sales) associated with a new object deployed at the candidate physical location.

In some examples, the computer system 104 can execute a trained demand model to determine the predicted demand value for the candidate physical location. Executing the trained demand model can involve applying the trained demand model to the first traffic score, the second traffic score, or both. For example, the computer system 104 can provide the first traffic score and the second traffic score as inputs to the trained demand model to receive a predicted demand value as output from the trained demand model. In some examples, the trained demand model can be defined according to the following equation:

$$X = \frac{((\text{first traffic score} * W1) + (\text{second traffic score} * W2))}{PDV}$$

where W1 and W2 are predefined weights that are user customizable; X is a translation factor; and PDV is the predicted demand value. The translation factor X can be different from the first translation factor and the second translation factor described above. The translation factor X can be used to convert the first and second traffic scores into the predicted demand value.

To determine the translation factor X, the computer system 104 can execute a training process using a set of training data. The training process can be executed prior to initiating the iterative optimization routine. The training data can include relationships between first traffic scores, second traffic scores, and actual demand values for existing objects at various physical locations. For example, one entry in the training data can include a first traffic score for an existing object within the target geographical region 102, a second traffic score for the existing object, and actual demand data for the existing object. The first traffic score and second traffic score may be determined using the Huff Gravity Model, as described above. The demand data can be acquired from the existing object. The training data may include hundreds or thousands of such entries, which can be used to identify a translation factor X that best fits the training data (e.g., that reduces a mean absolute percentage error (MAPE)).

In some examples, the translation factor X may be specific to the object type selected by the user. For example, the computer system 104 can determine different translation factors corresponding to different object types. Each translation factor can be determined based on a particular set of training data that corresponds to a specific object type. The computer system 104 can then select the appropriate translation factor X based on the object type selected for deployment by the user.

In block 416, the computer system 104 determines a predicted cannibalization factor for the candidate physical location. The predicted cannibalization factor can indicate the cannibalizing effect of a new object at the candidate physical location on existing objects and competitor objects in the target geographical region 102. For example, deploying a new object at the candidate physical location may cause traffic in the target geographical region 102 to be split among the new object and another existing object in the region, thereby taking traffic away from the existing object. This "stealing" of traffic by one object from another object can be referred to as cannibalization.

To determine the cannibalization factor, the computer system 104 can determine how traffic to the network is impacted by the presence and absence of a new object at the candidate physical location. This may involve the computer system 104 determining the overall market share (OMS) of the network in the target geographical region 102 with and without a new object at the candidate physical location. In some examples, the computer system 104 can determine the OMS with and without the new object by executing the Huff Gravity Model twice—once with the new object and once without the new object. If the OMS increases when a new object is deployed at the candidate physical location, it may mean that the cannibalizing effect of the new object is outweighed by the overall improvement in traffic flow to the network. If the OMS decreases when a new object is deployed at the candidate physical location, it may mean that the cannibalizing effect of the new object reduces overall traffic to the overall network. In such situations, deploying the new object at that candidate physical location may be more harmful than helpful.

In block 418, the computer system 104 generates an overall score for the candidate physical location based on the predicted demand value, the predicted overhead value, the predicted cannibalization factor, or any combination of these. For example, the computer system 104 can determine a net value by subtracting the predicted overhead value from the predicted demand value. The computer system 104 can then determine the overall score based on the net value and the predicted cannibalization factor.

In some examples, the computer system 104 can determine the overall score by applying a predefined algorithm that weighs some or all of the predicted demand value, the predicted overhead value, and the predicted cannibalization factor differently from one another. For instance, the predefined algorithm can apply a first weight to the predicted demand value, a second weight to the predicted overhead value, and a third weight to the predicted cannibalization factor. These weights may be the same as or different from one another.

In some examples, the overall score can represent a net benefit or detriment associated with deploying a new object at the candidate physical location. For example, if the new object is a new store, the overall score may represent a projected net profit or loss associated with deploying the new store at the candidate physical location. As another example, if the new object is a networking device or server, the overall score may represent a net benefit to the network associated with deploying the networking device or server at the candidate physical location.

In block 420, the computer system 104 determines whether a stopping condition has been satisfied. In one example, the stopping condition can be satisfied when the computer system 104 has completed a threshold number of iterations, which may be predefined. In another example, the stopping condition can satisfied when the computer system 104 has evaluated all of the candidate physical locations in the filtered group of physical locations. If the stopping condition has not been satisfied, the process can return to block 402, where a new candidate physical location can be selected and evaluated. Otherwise, the process can end.

In block 422, the computer system 104 identifies a candidate physical location as an optimal location based on its overall score. For example, the computer system 104 can select the candidate physical location with the highest overall score as the optimal location.

In some examples, the computer system 104 can identify multiple candidate physical locations as optimal locations based on their overall scores. For example, the computer system 104 can select all of the candidate physical locations that have overall scores that meet or exceed a predefined threshold as the optimal locations.

In some examples, different combinations of candidate physical locations can be evaluated to determine which combination is most optimal (e.g., has the highest set of overall scores). That combination of candidate physical locations may then be selected as the optimal combination. For example, the computer system 104 can select a first combination of the candidate physical locations. The computer system 104 can then add together the overall scores for the first combination of candidate physical locations to generate a first combined score for the first combination. After generating the first combined score, the computer system 104 can select a second combination of the candidate physical locations. The computer system 104 can then perform the same process generate a second combined score for the second combination. The computer system 104 may iterate this process, for example until all possible combinations of candidate physical locations have been evaluated. Whichever combination of candidate physical locations has the highest combined score may then be selected as the optimal combination.

Figure 5:
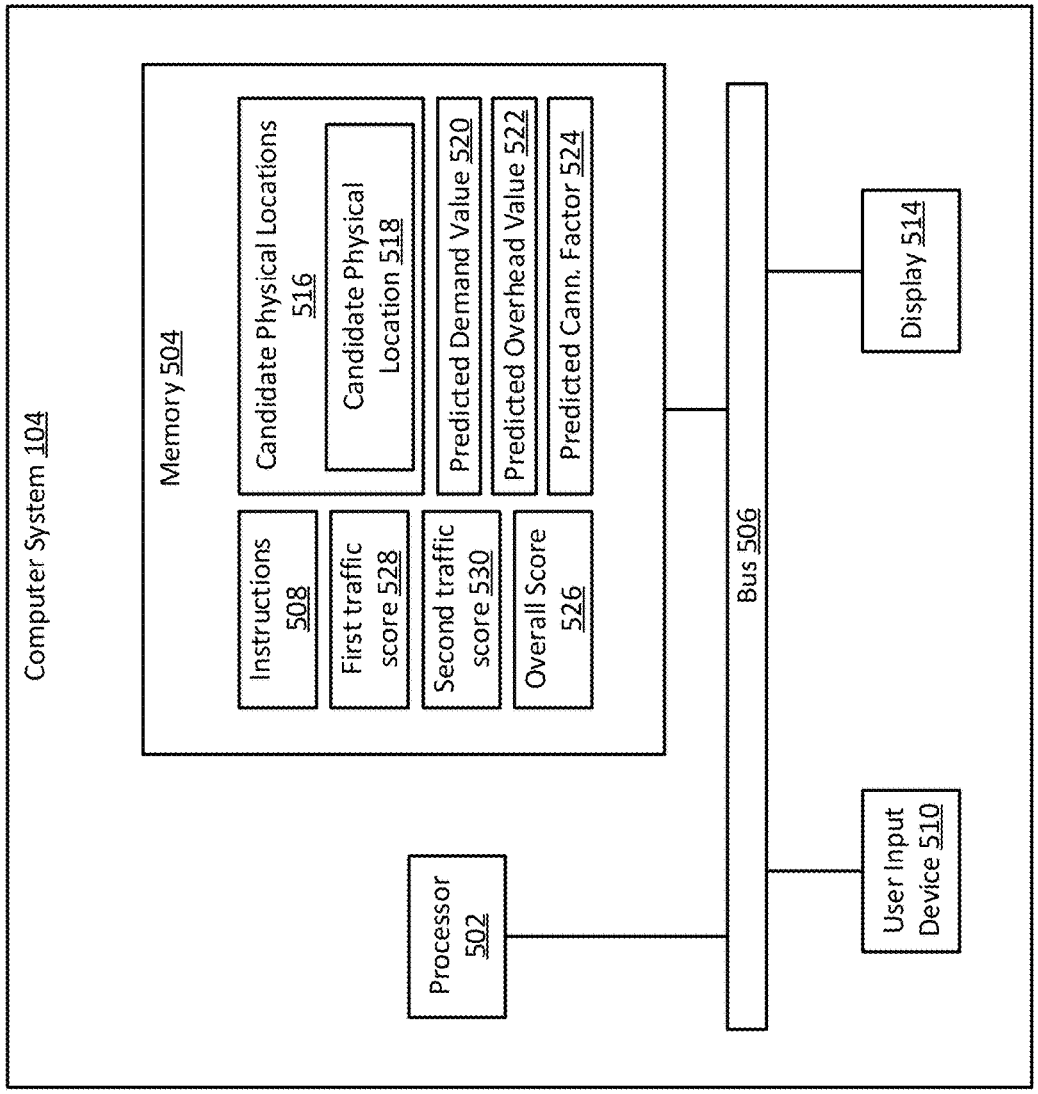
FIG. 5 shows a block diagram of an example of a computer system usable to implement some aspects of the present disclosure.

FIG. 5 shows a block diagram of an example of a computer system 104 usable to implement some aspects of the present disclosure. The computer system 104 can include any number of computing devices, such as multiple servers. As shown, the computer system 104 includes a processor 502 communicatively coupled to a memory 504 by a bus 506. The processor 502 can include one processor or multiple processors. Examples of the processor 502 can include a Field-Programmable Gate Array (FPGA), an application-specific integrated circuit (ASIC), or a microprocessor. The processor 502 can execute instructions 508 stored in the memory 504 to perform operations. In some examples, the instructions 508 can correspond to the optimization engine 108 of FIG. 1. The instructions 508 may include processor-specific instructions generated by a compiler or an interpreter from code written in any suitable computer-programming language, such as C, C++, C #, Java, or Python.

The memory 504 can include one memory device or multiple memory devices. The memory 504 can be volatile or non-volatile (it can retain stored information when powered off). Examples of the memory 504 can include electrically erasable and programmable read-only memory (EEPROM), flash memory, or cache memory. At least some of the memory 504 includes a non-transitory computer-readable medium from which the processor 502 can read instructions 508. A computer-readable medium can include electronic, optical, magnetic, or other storage devices capable of providing the processor 502 with the instructions 508 or other program code. Examples of a computer-readable mediums include magnetic disks, memory chips, ROM, random-access memory (RAM), an ASIC, a configured processor, and optical storage.

The computer system 104 also includes input components. One example of an input component can include the user input device 510, which may include one user input device or multiple user input devices. Examples of such user input devices can include a mouse, a keyboard, a touchpad, and a touch-screen display. The computer system 104 further includes output components. One example of an output component can include the display 514, which may include one display or multiple displays. Examples of such displays can include a liquid crystal display (LCD) or a light-emitting diode (LED) display. The computer system 104 may also include an audio output component such as a speaker, a haptic output component such as a haptic actuator, or another type of output component.

In some examples, the computer system 104 can perform one or more operations to identify an optimal location, or an optimal combination of locations, at which to deploy one or more objects. For example, the computer system 104 can execute an iterative optimization routine on a set of candidate physical locations 516 for an object. During an iteration, the computer system 104 can select a candidate physical location 518 from among the candidate physical locations 516. The computer system 104 determine a first traffic score 528 and a second traffic score 530 associated with the candidate physical location 518. The computer system 104 can determine a predicted demand value 520 for the candidate physical location 518 based on a first traffic score 528 and a second traffic score 530 associated with the candidate physical location 518. The computer system 104 can determine a predicted overhead value 522 for the candidate physical location 518. The computer system 104 can also determine a predicted cannibalization factor 524 for the candidate physical location 518. The computer system 104 can then generate an overall score 526 for the candidate physical location 518 based on the predicted demand value 520, the predicted overhead value 522, and the predicted cannibalization factor 524. The computer system 104 can iterate this process for some or all of the candidate physical locations 516 to generate multiple overall scores. The computer system 104 can then identify an optimal location, or an optimal combination of locations, at which to deploy one or more objects based on the overall scores associated with the candidate physical locations 516.

While FIG. 5 depicts various components (e.g., processor 502, memory 504, user input device 510, and display 514) as being internal to a single housing, in other examples the components may be distributed and in wired or wireless communication with one another. For example, the display 514 may be a computer monitor that is separate from a tower of the computer system 104 that performs the main processing. And although FIG. 5 depicts a certain number and arrangement of components, this is for illustrative purposes and not intended to be limiting. Other examples may include more components, fewer components, different components, or a different arrangement of the components shown in FIG. 5.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by one or more processors for causing the one or more processors to:

execute an iterative optimization routine configured to evaluate a group of candidate physical locations to determine one or more optimal locations at which to deploy one or more objects in a target geographical region, wherein each iteration in the iterative optimization routine involves:

selecting a candidate physical location from the group of candidate physical locations;

executing a trained demand model configured to output a predicted demand value for the candidate physical location based on a first traffic score and a second traffic score associated with the candidate physical location;

executing one or more trained overhead models configured to output a plurality of predicted overhead values for the candidate physical location;

determining a predicted cannibalization factor associated with the candidate physical location; and generating an overall score for the candidate physical location based on the predicted demand value, the plurality of predicted overhead values, and the predicted cannibalization factor;

determine the one or more optimal locations based on the overall score associated with each candidate physical location; and generate a graphical user interface that includes a visual map having graphical elements identifying the one or more optimal locations.

2. The non-transitory computer-readable medium of claim 1, further comprising program code that is executable by the one or more processors for causing the one or more processors to:
determine a translation factor based on a set of training data, the translation factor being usable for converting a first type of traffic score and a second type of traffic score into an estimated demand value, the trained demand model being configured to use the translation factor to determine the predicted demand value based on the first traffic score and the second traffic score.

3. The non-transitory computer-readable medium of claim 1, wherein the one or more trained overhead models include:
a first trained model configured to determine a first set of predicted overhead values;
a second trained model configured to determine a second set of predicted overhead values, the second set of predicted overhead values being different from the first set of predicted overhead values; and
a third trained model configured to determine a third set of predicted overhead values, the third set of predicted overhead values being different from the first set of predicted overhead values and the second set of predicted overhead values.

4. The non-transitory computer-readable medium of claim 3, further comprising program code that is executable by the one or more processors for causing the one or more processors to:
generate the first trained model by training a first model based on a first set of training data, wherein the first model is a naïve model;
generate the second trained model by training a second model based on a second set of training data, wherein the second model is an Extreme Gradient Boosting (XGBoost) model; and
generate the third trained model by training a third model based on a third set of training data, wherein the third model is an artificial neural network.

5. The non-transitory computer-readable medium of claim 1, further comprising program code that is executable by the one or more processors for causing the one or more processors to:
determine the predicted cannibalization factor using a Huff Gravity Model.

6. The non-transitory computer-readable medium of claim 1, further comprising program code that is executable by the one or more processors for causing the one or more processors to:
determine a plurality of combinations of the candidate physical locations in the group of candidate physical locations;
generate a plurality of combined scores for the plurality of combinations, wherein each combined score is generated for a respective combination of candidate physical locations based on the overall scores for the candidate physical locations in that respective combination; and
select an optimal combination of the candidate physical locations by comparing the plurality of combined scores to one another, wherein the optimal combination includes the one or more optimal locations.

7. The non-transitory computer-readable medium of claim 1, further comprising program code that is executable by the one or more processors for causing the one or more processors to:
determine the first traffic score and the second traffic score by using a Huff Gravity Model.

8. A method comprising:
executing, by one or more processors, an iterative optimization routine configured to evaluate a group of candidate physical locations to determine one or more optimal locations at which to deploy one or more objects in a target geographical region, wherein each iteration in the iterative optimization routine involves:
selecting a candidate physical location from the group of candidate physical locations;
executing a trained demand model configured to output a predicted demand value for the candidate physical location based on a first traffic score and a second traffic score associated with the candidate physical location;
executing one or more trained overhead models configured to output a plurality of predicted overhead values for the candidate physical location;
determining a predicted cannibalization factor associated with the candidate physical location; and
generating an overall score for the candidate physical location based on the predicted demand value, the plurality of predicted overhead values, and the predicted cannibalization factor;
determining, by the one or more processors, the one or more optimal locations based on the overall score associated with each candidate physical location; and
generating, by the one or more processors, a graphical user interface that includes a visual map having graphical elements identifying the one or more optimal locations.

9. The method of claim 8, further comprising determining a translation factor based on a set of training data, the translation factor being usable for converting a first type of traffic score and a second type of traffic score into an estimated demand value, the trained demand model being configured to use the translation factor to determine the predicted demand value based on the first traffic score and the second traffic score.

10. The method of claim 8, wherein the one or more trained overhead models include:
a first trained model configured to determine a first set of predicted overhead values; and
a second trained model configured to determine a second set of predicted overhead values, the second set of predicted overhead values being different from the first set of predicted overhead values.

11. The method of claim 10, further comprising:
generating the first trained model by training a first model based on a first set of training data; and
generating the second trained model by training a second model based on a second set of training data.

12. The method of claim 8, further comprising determining the predicted cannibalization factor using a Huff Gravity Model.

13. The method of claim 8, further comprising:
determining a plurality of combinations of the candidate physical locations in the group of candidate physical locations;
generating a plurality of combined scores for the plurality of combinations, wherein each combined score is generated for a respective combination of candidate physical locations based on the overall scores for the candidate physical locations in that respective combination; and selecting an optimal combination of the candidate physical locations by comparing the plurality of combined scores to one another, wherein the optimal combination includes the one or more optimal locations.

14. The method of claim 8, further comprising determining the first traffic score and the second traffic score using a Huff Gravity Model.

15. A system comprising:
one or more processors; and
one or more memories including instructions that are executable by the one or more processors for causing the one or more processors to:
  execute an iterative optimization routine configured to evaluate a group of candidate physical locations to determine one or more optimal locations at which to deploy one or more objects in a target geographical region, wherein each iteration in the iterative optimization routine involves:
    selecting a candidate physical location from the group of candidate physical locations;
    executing a trained demand model configured to output a predicted demand value for the candidate physical location based on a first traffic score and a second traffic score associated with the candidate physical location;
    executing one or more trained overhead models configured to output a plurality of predicted overhead values for the candidate physical location;
    determining a predicted cannibalization factor for the candidate physical location; and
    generating an overall score for the candidate physical location based on the predicted demand value, the plurality of predicted overhead values, and the predicted cannibalization factor;
  determine the one or more optimal locations based on the overall score associated with each candidate physical location; and
  generate a graphical user interface that includes a visual map having graphical elements identifying the one or more optimal locations.

16. The system of claim 15, wherein the one or more memories further include instructions that are executable by the one or more processors for causing the one or more processors to:
  determine a translation factor based on a set of training data, the translation factor being usable for converting a first type of traffic score and a second type of traffic score into an estimated demand value, the trained demand model being configured to use the translation factor to determine the predicted demand value based on the first traffic score and the second traffic score.

17. The system of claim 15, wherein the one or more trained overhead models include:
  a first trained model configured to determine a first set of predicted overhead values;
  a second trained model configured to determine a second set of predicted overhead values, the second set of predicted overhead values being different from the first set of predicted overhead values; and
  a third trained model configured to determine a third set of predicted overhead values, the third set of predicted overhead values being different from the first set of predicted overhead values and the second set of predicted overhead values.

18. The system of claim 17, wherein the one or more memories further include instructions that are executable by the one or more processors for causing the one or more processors to:
  generate the first trained model by training a first model based on a first set of training data, wherein the first model is a naïve model;
  generate the second trained model by training a second model based on a second set of training data, wherein the second model is an Extreme Gradient Boosting (XGBoost) model; and
  generate the third trained model by training a third model based on a third set of training data, wherein the third model is an artificial neural network.

19. The system of claim 15, wherein the one or more memories further include instructions that are executable by the one or more processors for causing the one or more processors to:
  determine the predicted cannibalization factor using a Huff Gravity Model.

20. The system of claim 15, wherein the one or more memories further include instructions that are executable by the one or more processors for causing the one or more processors to:
  determine a plurality of combinations of the candidate physical locations in the group of candidate physical locations;
  generate a plurality of combined scores for the plurality of combinations, wherein each combined score is generated for a respective combination of candidate physical locations based on the overall scores for the candidate physical locations in that respective combination; and
  selecting an optimal combination of the candidate physical locations by comparing the plurality of combined scores to one another, wherein the optimal combination includes the one or more optimal locations.

* * * * *